(12) United States Patent
Dubey et al.

(10) Patent No.: US 9,092,287 B2
(45) Date of Patent: *Jul. 28, 2015

(54) PRODUCT DEPLOYMENT SYSTEM

(71) Applicant: LinkedIn Corporation, Mountain View, CA (US)

(72) Inventors: Manish Dubey, Fremont, CA (US); Daniel Sully, Oakland, CA (US); Zoran Simic, Pleasant Hill, CA (US); Scott Holmes, Morgan Hill, CA (US); Daniel L. Grillo, Emerald Hills, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/562,384

(22) Filed: Dec. 5, 2014

(65) Prior Publication Data
US 2015/0095903 A1 Apr. 2, 2015

Related U.S. Application Data

(63) Continuation of application No. 14/036,743, filed on Sep. 25, 2013, now Pat. No. 8,918,781.

(51) Int. Cl.
G06F 9/445 (2006.01)
G06F 9/44 (2006.01)
G06F 11/34 (2006.01)

(52) U.S. Cl.
CPC .............. *G06F 8/60* (2013.01); *G06F 11/3466* (2013.01)

(58) Field of Classification Search
CPC ......... G06F 8/60; G06F 8/61; G06F 9/44505; G06F 11/3466; G06F 11/3409; G06F 11/3419
USPC .................................................. 717/127, 174
See application file for complete search history.

(56) References Cited

U.S. PATENT DOCUMENTS

| 8,918,781 | B1 | 12/2014 | Dubey et al. | |
| 2008/0306798 | A1* | 12/2008 | Anke et al. | 705/8 |
| 2011/0055889 | A1 | 3/2011 | Neill | |
| 2013/0232463 | A1* | 9/2013 | Nagaraja et al. | 717/101 |
| 2013/0246590 | A1 | 9/2013 | Ford et al. | |
| 2013/0297964 | A1 | 11/2013 | Hegdal et al. | |
| 2013/0304925 | A1 | 11/2013 | Ferris et al. | |

OTHER PUBLICATIONS

"U.S. Appl. No. 14/036,743, Final Office Action mailed Apr. 29, 2014", 17 pgs.
"U.S. Appl. No. 14/036,743, Non Final Office Action mailed Dec. 16, 2013", 15 pgs.

(Continued)

*Primary Examiner* — Anna Deng
(74) *Attorney, Agent, or Firm* — Schwegman Lundberg & Woessner, P.A.

(57) ABSTRACT

A product deployment system of an electronic document is described. An example product deployment system includes a deployment processor, a remote execution module, and a plan manager. The deployment processor may be configured to receive a request to deploy an application, generated a deployment plan, provide the deployment plan to the plan manager, and trigger a command to be sent from the remote execution module to the target hosts in the target host set. The plan manager provides the deployment plan to the target host set in response to receiving the identification of the deployment plan from the target host set. The plan manager may also monitor execution of the deployment plan by the target host set without saving a state of deployment process that is being performed at the target host set. The plan manager may also react to perceived failures that may occur at the target host set.

20 Claims, 4 Drawing Sheets

(56) References Cited

OTHER PUBLICATIONS

"U.S. Appl. No. 14/036,743, Notice of Allowance mailed Aug. 18, 2014", 8 pgs.

"U.S. Appl. No. 14/036,743, Response filed Mar. 17, 2014 to Non Final Office mailed Dec. 16, 2013", 13 pgs.

"U.S. Appl. No. 14/036,743, Response filed Jul. 29, 2014 to Final Office Action mailed Apr. 29, 2014", 11 pgs.

* cited by examiner

PRODUCT DEPLOYMENT SYSTEM

TECHNICAL FIELD

This application relates to the technical fields of software and/or hardware technology and, in one example embodiment, to a product deployment system.

BACKGROUND

A computer-implemented product is often deployed on a farm of hosts prior to being released to the public. A product may be, for example, an on-line social network, which is as a platform to connect people in virtual space. An on-line social network may be a web-based platform, such as, e.g., a social networking web site, and may be accessed by a user via a web browser, via a mobile application, etc.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
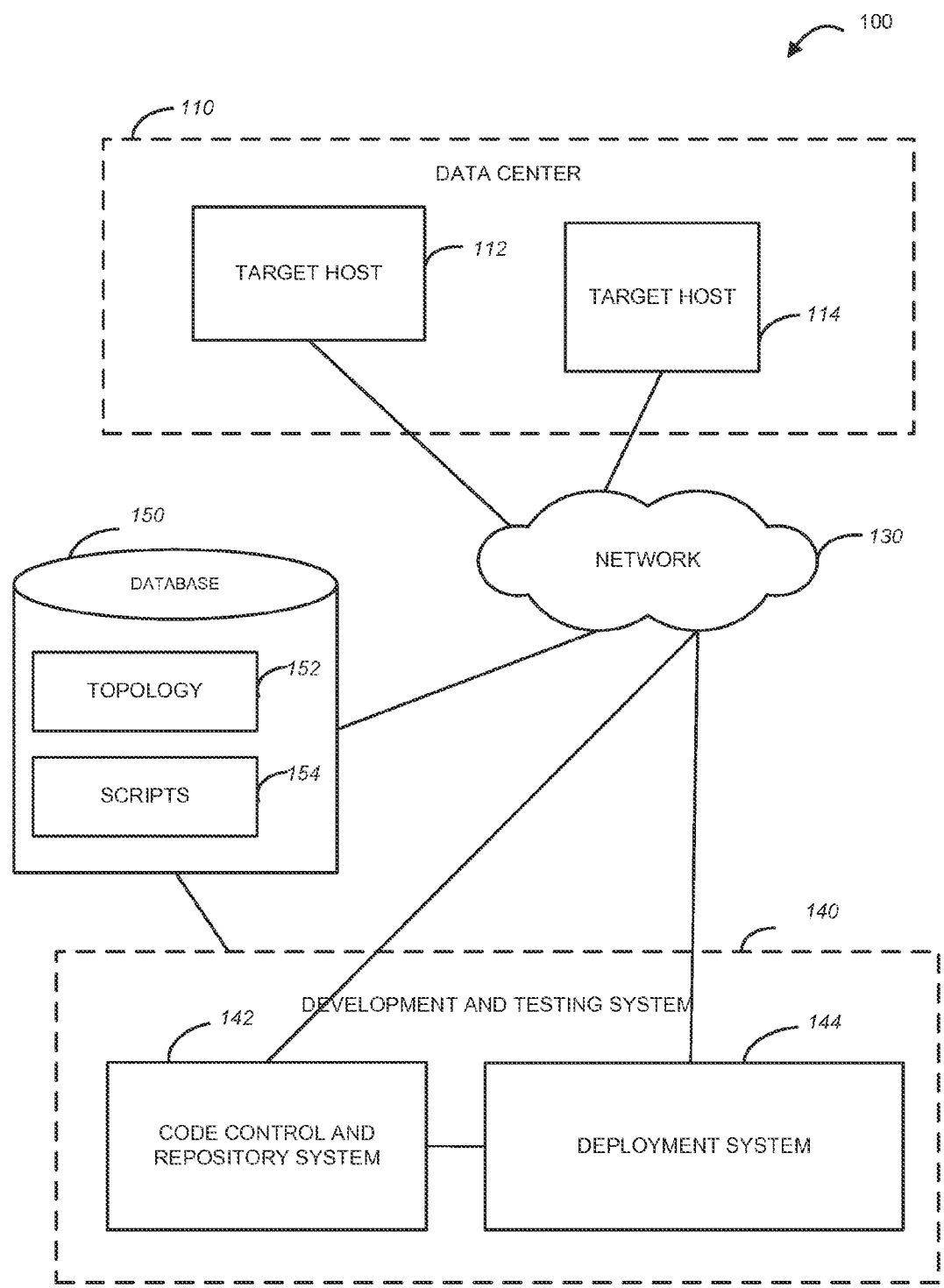
FIG. 1 is a diagrammatic representation of a network environment within which an example product deployment system may be implemented.

An example product deployment system is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

In one embodiment, example product deployment system may be utilized beneficially to effect production deployment of one or more computing application. A computing application may be, e.g., a web service or a collection of web services. For example, an on-line social networking application may be designed and built as a collection of web services. For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members.

A product deployment system (also referred to as simply a deployment system) may be designed for the purpose of initiating and monitoring deployment of a computing application, such as a web application or a collection of web applications, in a designated environment comprising one or more target hosts. The target hosts may be provided, e.g., in a data system located remotely from the deployment system and also from the system where the code for the web applications is being developed. A product deployment system, in one example embodiment, maintains deployment topology and deployment scripts for the applications that are to be be deployed.

Deployment topology contains so-called "what and where" information, i.e., information about which applications are to be executed in the deployment environment and which and how many specific target hosts are to execute these applications. A target host may be a desktop computer, a mobile device, etc. The deployment scripts contain so-called "how information," i.e., specific operations to be performed at a target host with respect to an application that is the subject of deployment. For example, a deployment script may include instructions for downloading the subject application to a specific location on the target host, unpackaging the subject application, launching the subject application, etc.

In one example embodiment, deployment topology and deployment scripts are independent from each other and from the code development system, in that the application code does not need to include information of where and how the application is to be deployed. The separation of the deployment topology from deployment scripts may provide increased scalability of the deployment process. For example, the deployment system may detect that the homepage of an on-line social networking system is receiving increased amount of traffic. The topology may then me updated to increase the number of target hosts. The topology may also be changed to specify that one or more additional applications are to be deployed on the target hosts.

In some embodiments, a deployment system may be stateless and idempotent. The deployment system is stateless in that an application has been deployed, the deployment system itself does not have a record of the operations that have been performed in the process of deploying the application. The state however is recorded locally on the target host. This allows deployment scripts to use local state on target host, as opposed to centrally maintained state on deployment system, to make decisions about how to preform requested action.

The idempotence feature of the deployment system may be useful where it is desirable to change the topology of the deployment, for example. Suppose an application has been deployed on several target hosts and there is a need for increased capacity. The request to deploy an application on the increased number of machines will result in deploying the application on the additional machines without affecting those machines on which the application has already been deployed. In another example, if a deployment script or part of a deployment script is being re-executed, e.g., in a situation where an application running in a target host crashed, those operations or commands from the script that have already been performed, when called again, do not negatively affect the deployment process.

As mentioned above, the deployment system may be provided separately from the code development system. The deployment system may be viewed as a deployment server and a plurality of target hosts. A deployment server may include one or more physical machines, and the target hosts may be provided in a geographical location remote from the geographical location of the deployment server.

In operation, according to one example embodiment, the deployment system receives a request to deploy an application, e.g., from a version control system that maintains and tracks versions of source code. As mentioned above, the request may be to deploy more than one application. A request to deploy an application may also include information regarding the version of the application to be deployed, the time and the origin of the request, the storage location of the application, etc. In some embodiments, this metadata associated with the request is obtained by the deployment system in response to receiving the request. A request to deploy an application may be a request to deploy a new application, to extend deployment capacity by adding target hosts, on which to execute the application, etc. The request to deploy an application is associated with a certain deployment topology that specifies which and how many specific target hosts are to execute the application and also with a deployment script. The set of target hosts on which the application is to be deployed may be referred to as the target host set.

The deployment server may include several components: a deployment processor, a remote execution module, and a plan manager. The deployment processor, in one embodiment, is responsible for initial processing of deployment requests. Specifically, in response to a request to deploy an application, the deployment processor component of the deployment system generates a deployment plan for deploying the application as requested, based on the associated deployment topology and the associated deployment script. If a deployment plan already exists for the request, the deployment processor may access the previously stored plan rather than generating it. The deployment processor then provides the deployment plan to the deployment tracker and also causes a command to be sent from the remote execution module to target hosts specified by the deployment topology. The remote execution module may be configured to process a command only if it can authenticate the requestor of the command with respect to this command. For example, a particular user may only be authenticated to request remote execution module to process a "download" command but not any other command.

A command triggered by the deployment processor to be sent from the remote execution module to target hosts includes the identification of a deployment plan that was generated or accessed by the deployment processor and stored by the plan manager. In one embodiment, remote execution calls made by the remote execution module are detached from the calling system, such that the return information generated by the remote execution may be returned to an arbitrary location. Here, for example, the return information generated by the remote execution is returned to the plan manager component of the deployment system.

A target host receives the command and, in turn, sends the identification of a deployment plan to the plan manager and requests the associated deployment plan. The target host then executes operations listed in the deployment plan and reports the progress and details of the execution to the plan manager. For example, as the target host is executing a certain step from the deployment plan, it reports to the plan manager details such as which step is being executed, how long the execution has taken, etc.

As the plan manager monitors execution of a deployment plan, it can identify certain events that may be indicative of a failure. For example, if the target host has not reported the completion of task for a period of time that is longer than a predetermined time threshold value, the plan manager may treat it as an indication that the current operation caused a system crash or some other failure and, accordingly, initiate recovery steps. The plan manager may thus be configured to monitor the progress of plan execution on a target host and to perform recovery operations. The plan manager may also be configured to collect metrics and calculate statistics with respect to the execution of a deployment plan on one or more target hosts. For example, the plan manager may calculate percentage of the operations from the deployment that have been completed, percentage of the number of target hosts that successfully reached a certain point in the execution of the script, and also keep a log of any failures and any recovery operations.

In some embodiments, the plan manager may be configured to respond to some types of failures (temporary failures) by requesting re-execution of a failed operation or re-execution of the entire plan on the target host, while for other types of failures (permanent failures) the plan manager may merely record and report the failure. The deployment plan is executed on every target host indicated in the associated deployment topology.

An example product deployment system may be implemented in the context of a network environment 100 illustrated in FIG. 1. As shown in FIG. 1, the network environment 100 may include a data center 110 comprising target hosts, such as, e.g., target hosts 112 and 114 and a development and testing system 140. The development and testing system 140, in one example embodiment, may include a code control and repository system 142 and a deployment system 144 and may be hosted on one or more physical machines. The code control and repository system 142 may be configured to permit version control of application code, storing of the application code, etc. The deployment system 144 may be configured to deploy applications stored in the on target hosts provided at the data center 110, monitor the deployment, and recover from some of the failures should those occur. As mentioned above, the number and the location of target hosts, on which the application is to be deployed is described in a deployment topology, which may be stored in a database 150 as topology 152. The database 150 may also store deployment scripts (scripts 152). As explained above, a deployment script may contain a list of operations to be performed on a target host with respect to an application that is the subject of deployment.

Various components of the deployment system 144 communicate with host machines provided in the data center 110 via a communications network 130. The communications network 130 may be a public network (e.g., the Internet, a mobile communication network, or any other network capable of communicating digital data). An example deployment system is illustrated FIG. 2.

Figure 2:
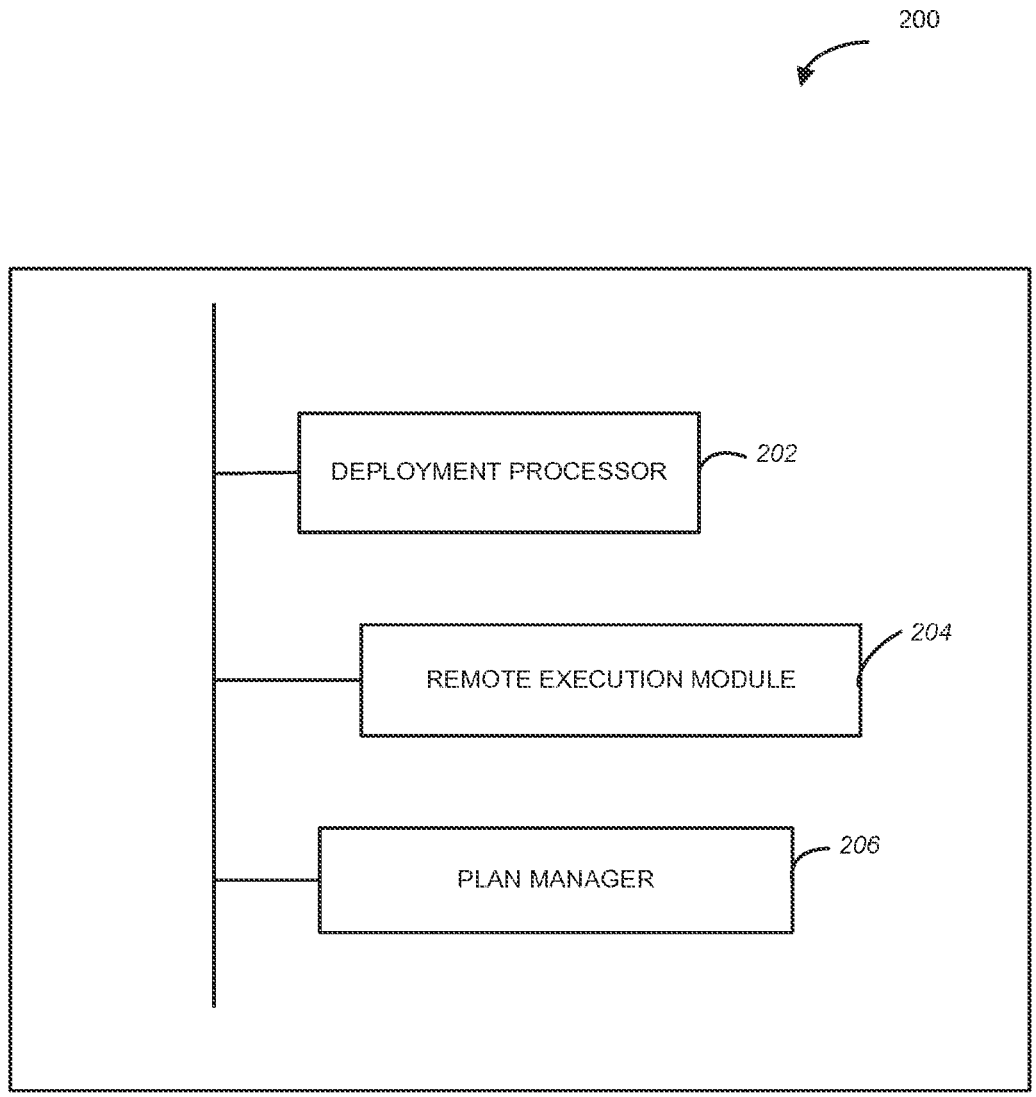
FIG. 2 is block diagram of a system to provide a product deployment system, in accordance with one example embodiment.

FIG. 2 is a block diagram of a system 200, which is a product deployment system. As shown in FIG. 2, the system 200 includes a deployment processor 202, a remote execution module 204, and a plan manager 206. The deployment processor 202 may be configured to receive a request to deploy an application. The request may indicate the name and the version of the application. As mentioned above, the application may comprise one or more web services. These web services may constitute an on-line social networking system or part of it. The request may be received, e.g., from the code control and repository system 142 of FIG. 1. The deployment processor 202 may then access the deployment topology and the deployment script associated with the request and generate a deployment plan. The deployment topology may indicate that the application referenced in the request is to be deployed on specific target hosts. The deployment processor 202 provides the deployment plan to the plan manager 206 and triggers a command to be sent from the remote execution module 204 to the target hosts in the target host set. The command may be an instruction to perform actions listed in a deployment plan having a particular identification. Instructions specified in a deployment plan may include an instruction to download an application package identified by name and version, an instruction to unpack the downloaded application package, and invoke the "install" script from the unpacked package.

As mentioned above the deployment system 200 is stateless and idempotent. Thus, the plan manager 206, while monitoring execution of the deployment plan by the target host does not save a state of deployment process that is being performed at the target host. Furthermore, when the plan manager 206 is requesting re-execution of an operation, the re-execution of the operation at the target host produces the same outcome at the target host as an earlier execution of that operation at the target host.

As described above, the remote execution system 204 authenticates each command that it is requested to send to target hosts in the target host set. The command sent from the remote execution module 204 to a target host includes an identification of the deployment plan, such that the target host set can request from the plan manager 206 the deployment plan. The command also includes information that the target host set can use to access the plan manager 206, e.g., a Uniform Resource Locator (URL) of the plan manager 206. The plan manager 206 may be configured provide the deployment plan to the target host set in response to receiving the identification of the deployment plan from the target host set.

The plan manager 206 may also be configured monitor execution of the deployment plan by the target host set and react to perceived failures that may occur at the target host set. For example, when the plan manager 206 detects an indication of a failure with respect to the execution of the deployment plan by a target host, it may record information about the indication of the failure if the failure is a permanent failure. If the plan manager 206 detects an indication of a so-called temporary failure with respect to the execution of the deployment plan, it may request that one or more operation from the deployment plan are re-executed at the host target. Example operations performed by the system 200 may be described with reference to FIG. 3.

Figure 3:
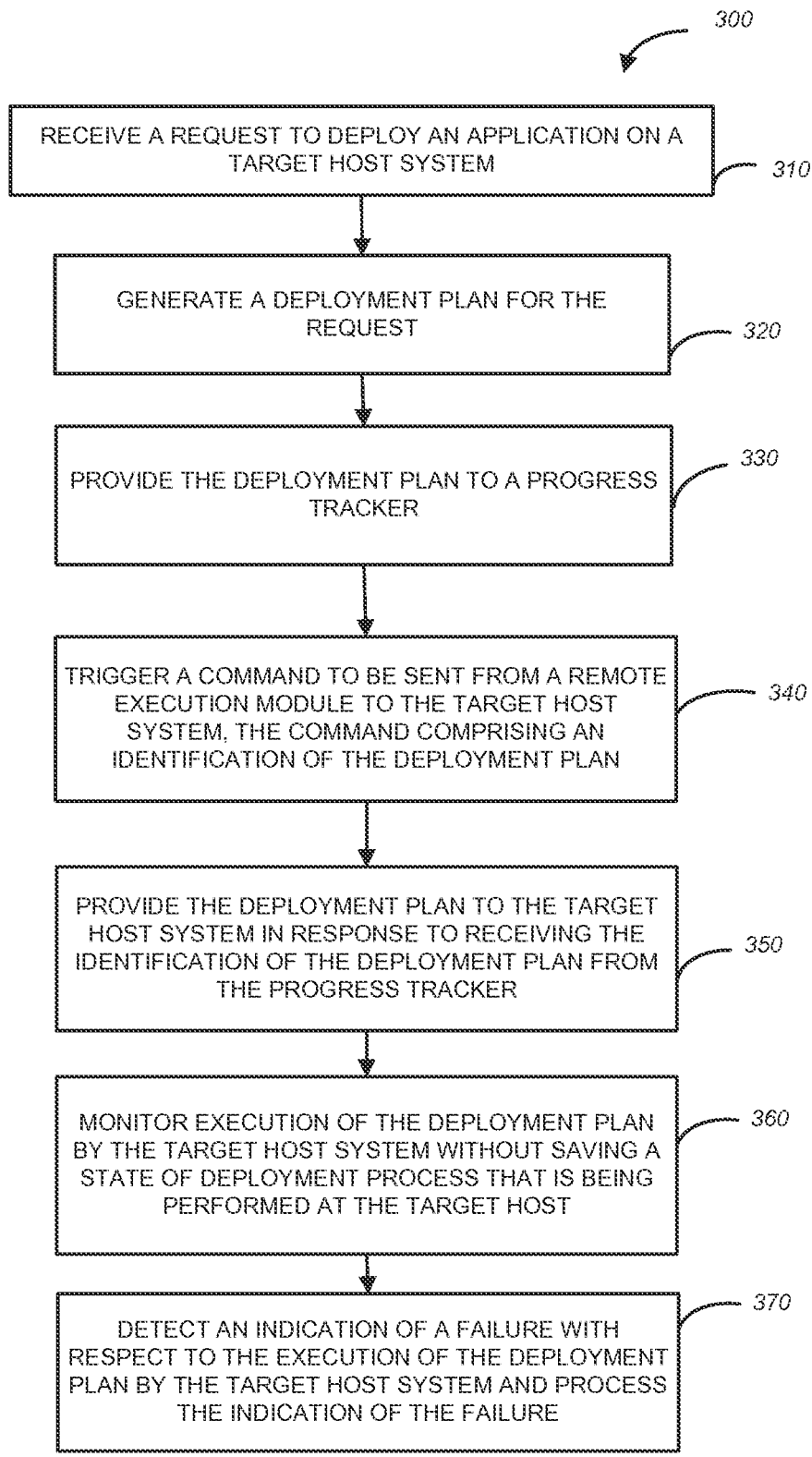
FIG. 3 is a flow chart of a method for utilizing a product deployment system, in accordance with an example embodiment.

FIG. 3 is a flow chart of a method 300 for utilizing a product deployment system, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the development and testing system 140 of FIG. 1 and, specifically, at the system 200 shown in FIG.

As shown in FIG. 3, the method 300 commences at operation 310, when the deployment processor 202 of FIG. 2 receives or detects a request to deploy an application on a set of target hosts. At operation 320, the deployment processor 202 generates a deployment plan for the request, based on the associated deployment topology and the deployment script. At operation 330, deployment processor 202 provides the deployment plan to the plan manager 206 of FIG. 2. The plan manager 206 stores the deployment plan in a database. At operation 340, the deployment processor 202 triggers the remote execution module 204 of FIG. 2 to send a command to target hosts in the target host set. The command includes an identification of the deployment plan and also information that the target host set can use to access the plan manager 206, e.g., a Uniform Resource Locator (URL) of the plan manager 206.

At operation 350, the plan manager 206 provides the deployment plan to requesting target hosts, based on the deployment plan identification received from the target hosts. At operation 360, the plan manager 206 monitors execution of the deployment plan by the target hosts. At operation 360, the plan manager detects an indication of a failure at a target hose and processes the failure, e.g., by recording associated information or requesting partial or complete re-execution of the deployment plan at the target host.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
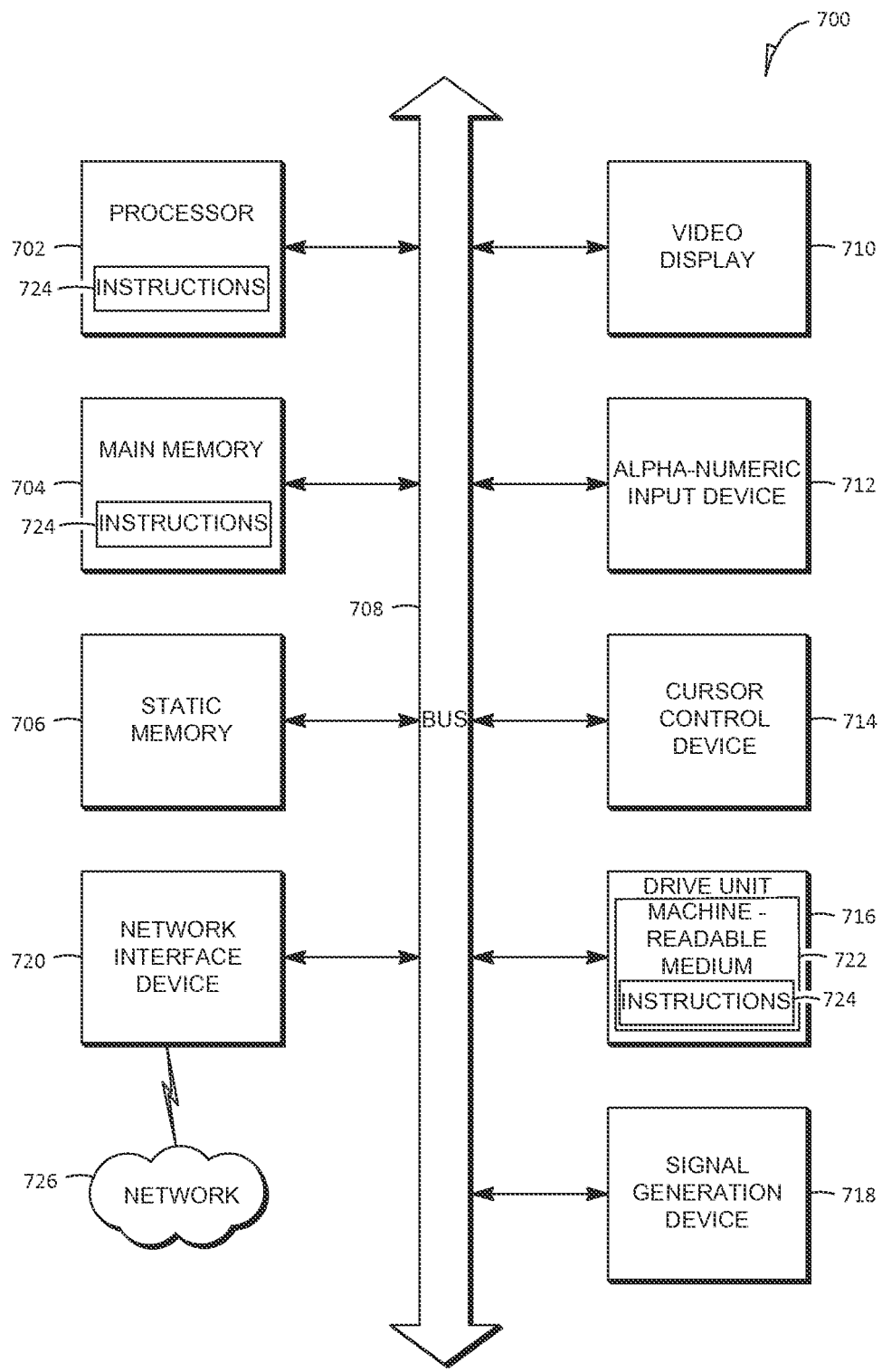
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a target machine in a server-target network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, target or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, the product deployment system has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
accessing a deployment topology and a deployment script, the deployment topology indicating one or more computing applications and one or more target hosts to execute the one or more computing applications, the deployment script indicating one or more operations to be performed at the one or more target hosts with respect to the one or more computing applications;
at a deployment processor, generating a deployment plan based on the deployment topology and the deployment script, utilizing at least one processor;
using at least one processor, causing execution of the deployment plan by the one or more target hosts; and
at a plan manager, monitoring execution of the deployment plan by a target host from the one or more target hosts without saving, at the plan manager, a state of deployment process that is being performed at the target host, the target host provided on a machine that is distinct from a machine hosting the plan manager.

2. The method of claim 1, wherein the causing of the execution of the deployment plan comprises:
providing the deployment plan o the plan manager;
utilizing a remote execution module, triggering a command to be executed on the target host, the command comprising an identification of the deployment plan;
in response to receiving the identification of the deployment plan at the plan manager, providing the deployment plan from the plan manager to the target host.

3. The method of claim 1, wherein requesting re-execution of an operation at the target host produces the same outcome at the target host as an earlier execution of the operation at the target host.

4. The method of claim 1, wherein the deployment script includes instructions for downloading the one or more computing applications to a specific location on the target host.

5. The method of claim 1, wherein the deployment script includes instructions for launching the one or more computing applications.

6. The method of claim 1, comprising:
detecting, at the plan manager, an indication of a failure with respect to the execution of the deployment plan by the target host; and
processing the indication of the failure.

7. The method of claim 6, wherein the processing of the indication of a failure comprises:
determining that the failure is a temporary failure; and
requesting that one or more operation from the deployment plan are re-executed at the host target system.

8. The method of claim 6, wherein the processing of the indication of a failure comprises:
determining that the failure is a permanent failure; and
recording information about the indication of the failure.

9. The method of claim 1, wherein a computing application from the one or more computing applications comprises one or more web services.

10. The method of claim 8, wherein the one or more web services are associated with an on-line social networking system.

11. A computer-implemented system comprising:
a deployment processor, implemented using at least one processor, to:
access a deployment topology and a deployment script, the deployment topology indicating one or more computing applications and one or more target hosts to execute the one or more computing applications, the deployment script indicating one or more operations to be performed at the one or more target hosts with respect to the one or more computing applications,
generate a deployment plan based on the deployment topology and the deployment script, and
cause execution of the deployment plan by the one or more target hosts;
and
a plan manager, implemented using at least one processor, to monitor execution of the deployment plan by a target host from the one or more target hosts without saving, at the plan manager, a state of deployment process that is being performed at the target host, the target host provided on a machine that is distinct from a machine hosting the plan manager.

12. The system of claim 11, wherein:
the deployment processor is to:
provide the deployment plan to the plan manager;
utilizing a remote execution module, trigger a command to be executed on the target host, the command comprising an identification of the deployment plan; and
the plan manager is to provide the deployment plan to the target host in response to receiving the identification of the deployment plan.

13. The system of claim 11, wherein requesting re-execution of an operation at the target host produces the same outcome at the target host as an earlier execution of the operation at the target host.

14. The system of claim 11, wherein the deployment script includes instructions for downloading the one or more computing applications to a specific location on the target host.

15. The system of claim 11, wherein the deployment script includes instructions for launching the one or more computing applications.

16. The system of claim 11, wherein the plan manager is to:
detect an indication of a failure with respect to the execution of the deployment plan by the target host; and
process the indication of the failure.

17. The system of claim 16, wherein the plan manager is to:
determine that the failure is a temporary failure; and
request that one or more operation from the deployment plan are re-executed at the host target system.

18. The system of claim 16, wherein the plan manager is to:
determine that the failure is a permanent failure; and
record information about the indication of the failure.

19. The system of claim 11, wherein a computing application from the one or more computing applications comprises one or more web services.

20. A machine-readable non-transitory storage medium having instruction data to cause a machine to perform operations of:
- accessing a deployment topology and a deployment script, the deployment topology indicating one or more computing applications and one or more target hosts to execute the one or more computing applications, the deployment script indicating one or more operations to be performed at the one or more target hosts with respect to the one or more computing applications;
- at a deployment processor, generating a deployment plan based on the deployment topology and the deployment script, utilizing at least one processor;
- causing execution of the deployment plan by the one or more target hosts; and
- at a plan manager, monitoring execution of the deployment plan by a target host from the one or more target hosts without saving, at the plan manager, a state of deployment process that is being performed at the target host, the target host provided on a machine that is distinct from a machine hosting the plan manager.

\* \* \* \* \*